(12) United States Patent
Ohya et al.

(10) Patent No.: US 9,608,812 B2
(45) Date of Patent: Mar. 28, 2017

(54) COMMON SECRET KEY GENERATION DEVICE, ENCRYPTION DEVICE, DECRYPTION DEVICE, COMMON SECRET KEY GENERATION METHOD, ENCRYPTION METHOD, DECRYPTION METHOD, AND PROGRAM

(71) Applicants: CRYPTO BASIC CORPORATION, Kawasaki-shi, Kanagawa (JP); ACTEIIVE CORPORATION, Noda-shi, Chiba (JP)

(72) Inventors: Masanori Ohya, Tokyo (JP); Satoshi Iriyama, Tokyo (JP); Luigi Accardi, Rome (IT); Massimo Regoli, Rome (IT)

(73) Assignees: CRYPTO BASIC CORPORATION, Kanagawa (JP); ACTEIIVE CORPORATION, Chiba (JP)

( * ) Notice: Subject to any disclaimer, the term of this patent is extended or adjusted under 35 U.S.C. 154(b) by 127 days.

(21) Appl. No.: 14/412,028

(22) PCT Filed: Jul. 4, 2013

(86) PCT No.: PCT/JP2013/068419
§ 371 (c)(1),
(2) Date: Dec. 30, 2014

(87) PCT Pub. No.: WO2014/007347
PCT Pub. Date: Jan. 9, 2014

(65) Prior Publication Data
US 2015/0156018 A1 Jun. 4, 2015

(30) Foreign Application Priority Data
Jul. 5, 2012 (JP) .................................. 2012-151835

(51) Int. Cl.
*H04L 9/08* (2006.01)
*H04L 9/06* (2006.01)

(52) U.S. Cl.
CPC .......... *H04L 9/0869* (2013.01); *H04L 9/0662* (2013.01); *H04L 9/0816* (2013.01); *H04L 9/0841* (2013.01); *H04L 2209/24* (2013.01)

(58) Field of Classification Search
CPC ... H04L 9/0869; H04L 9/0841; H04L 9/0816; H04L 9/0662; H04L 2209/24
See application file for complete search history.

(56) References Cited

U.S. PATENT DOCUMENTS

| | | | |
|---|---|---|---|
| 5,491,749 A | | 2/1996 | Rogaway |
| 6,081,597 A | * | 6/2000 | Hoffstein ............ H04L 9/3093 380/28 |

(Continued)

FOREIGN PATENT DOCUMENTS

| | | |
|---|---|---|
| JP | H 05216409 | 8/1993 |
| JP | H 7212356 | 8/1995 |

(Continued)

OTHER PUBLICATIONS

Yeh et al., A new cryptosystem using matrix transformation, Oct. 1991, IEEE International Carnahan Conference on Security Technology, pp. 131-138.*

(Continued)

*Primary Examiner* — Kenneth Chang
(74) *Attorney, Agent, or Firm* — Thomas | Horstemeyer, LLP

(57) ABSTRACT

Public data including a prime number p, a natural number d, a matrix Q, and a matrix S are acquired by a public data acquisition section, and secret key including natural numbers $n_A$, $k_A$ is generated by a shared secret key generation section. A matrix $M_A$ ($M_A = S^{-k_A} Q^{n_A} S^{k_A}$) is calculated by a non-commutative matrix generation section and transmitted to a communication party, and a matrix $M_B$ ($M_B = S^{-k_B} Q^{n_B} S^{k_B}$) is acquired from the communication party. A matrix $M_{AB}$ ($M_{AB} = S^{-k_A} M_B^{n_A} S^{k_A}$) is computed as a common secret (Continued)

key by a shared secret key computation section. An encryption/decryption device is thereby capable of rapid generation of the secure common secret key.

8 Claims, 9 Drawing Sheets

(56) References Cited

U.S. PATENT DOCUMENTS

| | | | | |
|---|---|---|---|---|
| 6,782,101 | B1* | 8/2004 | Huntress | G06T 1/0021 380/28 |
| 6,898,288 | B2* | 5/2005 | Chui | H04K 1/00 380/278 |
| 2007/0242822 | A1 | 10/2007 | Hamada | |
| 2008/0037774 | A1* | 2/2008 | Slavin | H04L 9/302 380/30 |
| 2011/0142230 | A1* | 6/2011 | Zuili | G06F 21/602 380/28 |

FOREIGN PATENT DOCUMENTS

| | | |
|---|---|---|
| JP | 2000516733 | 12/2000 |
| JP | 2001202010 | 7/2001 |
| JP | 2004534971 | 11/2004 |
| JP | 2006262425 | 9/2006 |
| JP | 2007288254 | 11/2007 |

OTHER PUBLICATIONS

International Search Report and Written Opinion Application No. PCT/JP2013/068419 dated Aug. 6, 2013, 9 pages.

Ottaviani et al., "Conjugation as public key agreement protocol in mobile cryptography", Security and Cryptography (SECRYPT), Proceedings of the 2010 international Conference, Jul. 2010, 6 pages.

Accardi et al., "Conjugation as public key agreement protocol in mobile cryptography", The QP-DYN algorithms, [online], 2011, [retrieved on Apr. 8, 2013], Internet <URL:http://www.cryptalarm.it/ca/documenti/upload2set/8125_chap01.pdf>, 16 pages.

* cited by examiner

FIG.4A

ENCRYPTION

| Plaintext XOR | Key | → | cyphertext |
|---|---|---|---|
| 0101011 ⊕ | 1100110 | → | 1011101 |

FIG.4B

DECRYPTION

Cyphertext XOR    Key    →    plaintext
1011101    ⊕    1100110    →    0101011

COMMON SECRET KEY GENERATION DEVICE, ENCRYPTION DEVICE, DECRYPTION DEVICE, COMMON SECRET KEY GENERATION METHOD, ENCRYPTION METHOD, DECRYPTION METHOD, AND PROGRAM

CROSS-REFERENCE TO RELATED APPLICATION

This application is the National Stage of International Application No. PCT/JP2013/068419, filed 4 Jul. 2013, which claims the benefit of and priority to JP 2012-151835, filed 5 Jul. 2012, the contents of both of which are incorporated by reference as if fully set forth herein.

TECHNICAL FIELD

The present invention relates to a common secret key generation device, an encryption device, a decryption device, a common secret key generation method, an encryption method, a decryption method, and a program.

BACKGROUND ART

Hitherto, an encoding method and encryption method having messages that are public and non-commutative has been known (Japanese Patent Application Laid-Open (JP-A) 2001-202010). Public key encryption systems employing finite commutative groups, and public key encryption systems employing a non-commutative ring R are also known (Japanese National-Phase Publication Nos. 2004-534971, 2000-516733).

An over-network exchange verification and public key exchange system according to a public key encryption protocol, and key management of a public key encryption system based on a control vector are also known (JP-A Nos. 2006-262425, H05-216409).

DISCLOSURE OF INVENTION

Technical Problem

An object of the present invention is to provide a common secret key generation device, an encryption device, a decryption device, a common secret key generation method, an encryption method, a decryption method, and a program that enable high-speed, generation of secure common secret keys.

Solution to Problem

In order to achieve this object, a common secret key generation device according to a first aspect, includes: a public data setting section that sets public data including a prime number p, a natural number d, a d×d matrix Q (mod p) with determinant equal to 1, and a d×d matrix S (mod p) for which an inverse matrix exists; a secret key generation section that generates a secret key including natural numbers $n_A$(mod p), $k_A$(mod p); a matrix calculation section that employs the secret key to calculate a d×d matrix $M_A$(mod p) according to the following Equation (I), and transmits the matrix $M_A$ to a communication partner; a matrix acquisition section that acquires a d×d matrix $M_B$(mod p), calculated by employing natural numbers $n_B$(mod p), $k_B$(mod p) included in a secret key of the communication partner according to the following Equation (II); and a common secret key computation section that computes a d×d matrix $M_{AB}$(mod p) as a common secret key by employing the matrix MB acquired by the matrix acquisition section according to the following Equation (III).

$$M_A = S^{-k_A} Q^{n_A} S^{k_A} \tag{I}$$

$$M_B = S^{-k_B} Q^{n_B} S^{k_B} \tag{II}$$

$$M_{AB} = S^{-k_A} M_B^{n_A} S^{k_A} \tag{III}$$

A program according to a second aspect is a program that causes a computer to function as: a public data setting section that sets public data including a prime number p, a natural number d, a d×d matrix Q (mod p) with determinant equal to 1, and a d×d matrix S (mod p) for which an inverse matrix exists; a secret key generation section that generates a secret key including natural numbers $n_A$(mod p), $k_A$(mod p); a matrix calculation section that employs the secret key to calculate a d×d matrix $M_A$(mod p) according to the following Equation (IV), and transmits the matrix $M_A$ to a communication partner; a matrix acquisition section that acquires a d×d matrix $M_B$(mod p), calculated by employing natural numbers $n_B$ (mod p), $k_B$(mod p) included in a secret key of the communication partner according to the following Equation (V); and a common secret key computation section that computes a d×d matrix $M_{AB}$(mod p) as a common secret key by employing the matrix $M_B$ acquired by the matrix acquisition section according to the following Equation (VI).

$$M_A = S^{-k_A} Q^{n_A} S^{k_A} \tag{IV}$$

$$M_B = S^{-k_B} Q^{n_B} S^{k_B} \tag{V}$$

$$M_{AB} = S^{-k_A} M_B^{n_A} S^{k_A} \tag{VI}$$

Thus, the matrix calculated by employing the public data and the secret key are exchanged with a communication partner, enabling rapid generation of the secure common secret key by computation of the common secret using the matrix obtained from the communication partner.

A secret key generation section according to a third aspect may be configured such that the secret key that includes natural numbers $n_A$(mod p), $k_A$(mod p) is generated, and renewed for each communication with the communication partner. This thereby enables generation of a more secure common secret key.

An encryption device according to a fourth aspect includes: a matrix generation section that generates two non-commutative matrices A1, A2, based on the common secret key $M_{AB}$ generated by the common secret key generation device of claim 1 or claim 2, and two prime numbers p1, p2, that are set in common with a decryption device; a matrix operation section that derives a vector $v_i^1$ by operating the non-commutative matrix A1 on a d dimensional initial vector $v_0$ set in common with the decryption device or on a d dimensional vector $v_{i-1}^1$ derived the previous time, that derives a vector $v_i^2$ by operating the non-commutative matrix A2 on the initial vector $v_0$ or on a d dimensional vector $v_{i-1}^2$ derived the previous time, wherein the matrix operation section substitutes at least one out of a sum calculation or a product calculation for operations of the non-commutative matrices A1, A2 into a predetermined calculation method combining a plurality of operator types, and performs operations of the non-commutative matrices A1, A2; a bit sequence transformation section that derives a bit sequence W1 by performing a non-linear transformation to transform the vector $v_i^1$ derived by the matrix operation section into a bit sequence and joining the transformed bit sequence to the bit sequence W1 derived the previous time, and that derives a bit sequence W2 by performing a non-linear transformation to transform the vector $v_i^2$ into a bit sequence and joining the transformed bit sequence to the bit sequence W2 derived the previous time; a bit number determination section that repeats the operation by the matrix operation section and the transformation and joining by the bit sequence transformation section until the respective numbers of bits of the bit sequence W1 and the bit sequence W2 derived by the bit sequence transformation section have reached a number of bits of a bit sequence expressing encryption target data; a pseudo-random number sequence generation section that derives a pseudo-random number bit sequence by calculating an exclusive logical sum between the bit sequence W1 and the bit sequence W2; and an encryption section that encrypts the encryption target data by calculating an exclusive logical sum between the pseudo-random number bit sequence derived by the pseudo-random number sequence generation section and the bit sequence expressing the encryption target data.

Thus, at least one out of a sum calculation or a product calculation for operations of the non-commutative matrices A1, A2 is substituted into the calculation method combining a plurality of operator types, and the pseudorandom number bit sequences are derived by repeatedly performing operation of the non-commutative matrices A1, A2 and non-linear transformations on vectors, and calculating an exclusive logical sum of the obtained bit sequences W1, W2. Increased speed of encryption and increased cryptographic strength can be achieved when the number of bits of the encryption target data is variable by employing encryption with the pseudorandom number bit sequence.

A matrix operation section according to an encryption device of a fifth aspect may be configured such that when deriving the vector $v_i^1$ by operating the non-commutative matrix A1 on the initial vector $v_0$ or on the vector $v_{i-1}^1$ derived the previous time, by calculating the elements of the vector $v_i^1$ by, for each element of the vector $v_i^1$, operating the non-commutative matrix A1 on the initial vector $v_0$, or on the vector $v_{i-1}^1$, into which the already calculated elements of the vector $v_i^1$ have been substituted, and, when deriving the vector $v_i^2$ by operating the non-commutative matrix A2 on the initial vector $v_0$ or on the vector $v_{i-1}^2$ derived the previous time, calculating the elements of the vector $v_i^2$ by, for each element of the vector $v_i^2$, operating the non-commutative matrix A2 on the initial vector $v_0$, or on the vector $v_{i-1}^2$, into which the already calculated elements of the vector $v_i^1$ have been substituted. An increase in cryptographic strength is thereby enabled.

A bit sequence transformation section according to an encryption device of a sixth aspect may be configured such that, as the non-linear transformation, the vector $v_i^1$ derived by the matrix operation section is transformed into a bit sequence, cutoff processing is performed on the transformed bit sequence that cuts off a leading bit sequence fulfilling predetermined conditions, the bit sequence from which the leading bit sequence has been cut off is joined to the previously derived bit sequence W1 and the vector $v_i^2$ is transformed into a bit sequence, cutoff processing is performed on the transformed bit sequence, and the bit sequence from which the leading bit sequence has been cut off is joined to the previously derived bit sequence W2. An increase in cryptographic strength is thereby enabled.

A bit sequence transformation section of an encryption device according to a seventh aspect may be configured such that, as the cutoff processing on the transformed bit sequence, a leading bit sequence, formed from continuous 0s from the leading bit and the first appearing 1 from the leading bit, is cut off as the leading bit sequence fulfilling the predetermined conditions, and processing is performed that cuts off a leading bit sequence having a predetermined number of bits from the bit sequence from which the leading bit sequence has been cut off. An increase in cryptographic strength is thereby enabled.

A decryption device according to an eighth aspect includes: a matrix generation section that generates two non-commutative matrices A1, A2, based on the common secret key $M_{AB}$ generated by the common secret key generation device of claim 1 or claim 2, and two prime numbers p1, p2, that are set in common with an encryption device; a matrix operation section that derives a vector $vi^i$ by operating the non-commutative matrix A1 on a d dimensional initial vector $v_0$ set in common with the encryption device or on a d dimensional vector $v_{i-1}^1$ derived the previous time, that derives a vector $v_i^2$ by operating the non-commutative matrix A2 on the initial vector $v_0$ or on a d dimensional vector $v_{i-1}^2$ derived the previous time, wherein the matrix operation section substitutes at least one out of a sum calculation or a product calculation for operations of the non-commutative matrices A1, A2 into a predetermined calculation method combining a plurality of operator types, and performs operations of the non-commutative matrices A1, A2; a bit sequence transformation section that derives a bit sequence W1 by performing a non-linear transformation to transform the vector $v_i^1$ derived by the matrix operation section into a bit sequence and joining the transformed bit sequence to the bit sequence W1 derived the previous time, and that derives a bit sequence W2 by performing a non-linear transformation to transform the vector $v_i^2$ into a bit sequence and joining the transformed bit sequence to the bit sequence W2 derived the previous time; a bit number determination section that repeats the operation by the matrix operation section and the transformation and joining by the bit sequence transformation section until the respective numbers of bits of the bit sequence W1 and the bit sequence W2 derived by the bit sequence transformation section have reached a number of bits of a bit sequence expressing decryption target data; a pseudo-random number sequence generation section that derives a pseudo-random number bit sequence by calculating an exclusive logical sum between the bit sequence W1 and the bit sequence W2; and a decryption section that decrypts the decryption target data by calculating an exclusive logical sum between the pseudo-random number bit sequence derived by the pseudo-random number sequence generation section and the bit sequence expressing the decryption target data.

Advantageous Effects of Invention

According to the common secret key generation device, method, and program of an aspect of the present invention, a matrix calculated employing the public data and the secret key is exchanged with a communication party, and a common secret key is computed employing a matrix obtained from the communication party. This thereby enables rapid generation of a secure common secret key.

According to the encryption device, encryption method, decryption device, and decryption method of an aspect of the present invention, a pseudorandom number bit sequence is derived by substituting at least one out of a sum calculation or a product calculation for operations of the non-commutative matrices A1, A2 into a calculation method combining a plurality of operator types, repeatedly performing operations of the non-commutative matrices A1, A2 on a vector and performing a non-linear operation thereon, and calculating an exclusive logical sum between the obtained bit sequences W1, W2. Increased speed of encryption processing or decryption processing, and increased cryptographic strength, can be achieved when the number of bits of the encryption target data or the decryption target data is variable by employing encryption or decryption with the pseudorandom number bit sequence.

BRIEF DESCRIPTION OF DRAWINGS

FIG. 4A is a diagram for explaining an encryption method.

FIG. 4B is a diagram for explaining a decryption method.

BEST MODE FOR CARRYING OUT THE INVENTION

Detailed explanation follows regarding an exemplary embodiment of the present invention, with reference to the drawings.

System Configuration

Figure 1:
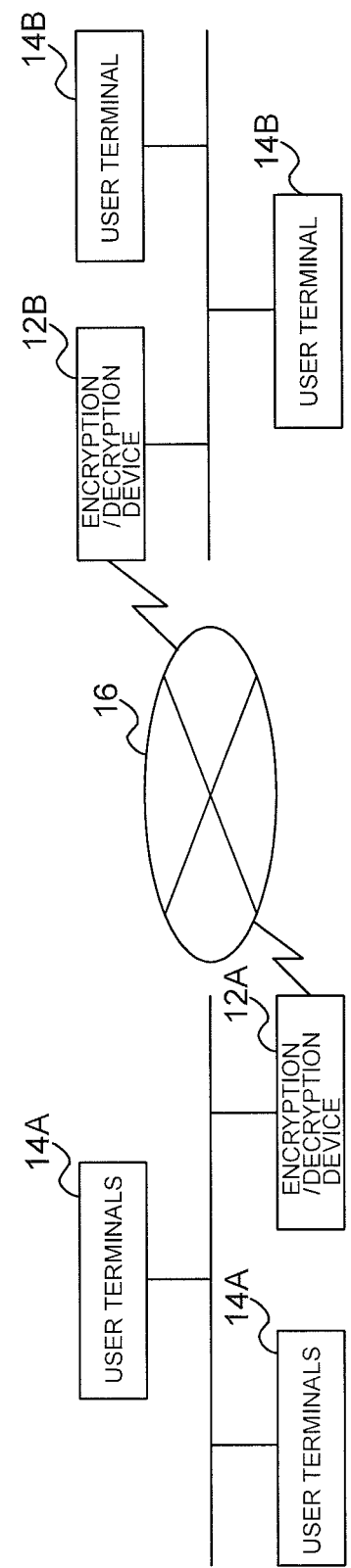
FIG. 1 is a schematic diagram illustrating a configuration of an encryption processing system according to an exemplary embodiment of the present invention.

As illustrated in FIG. 1, an encryption processing system 10 according to an exemplary embodiment of the present invention includes encryption-decryption devices 12A, 12B, plural user terminals 14A, plural user terminals 14B, and an internet access network 16. The encryption-decryption devices 12A, 12B are examples of encryption devices and decryption devices.

The plural user terminals 14A are connected to the encryption-decryption device 12A, and the encryption-decryption device 12A is connected to the internet access network 16. The plural user terminals 14B are connected to the encryption-decryption device 12B, and the encryption-decryption device 12B is connected to the internet access network 16. The encryption-decryption devices 12A, 12B are connected to each other through the internet access network 16.

In order to perform data transmission through the internet access network 16, the user terminals 14A output transmission data to the internet access network 16 through the encryption-decryption device 12A. In order to perform data reception through the internet access network 16, reception data is input to the user terminals 14A from the internet access network 16 through the encryption-decryption device 12A.

In order to perform data transmission through the internet access network 16, the user terminals 14B output transmission data to the internet access network 16 through the encryption-decryption device 12B. In order to perform data reception through the internet access network 16, reception data is input to the user terminals 14B from the internet access network 16 through the encryption-decryption device 12B.

Figure 2:
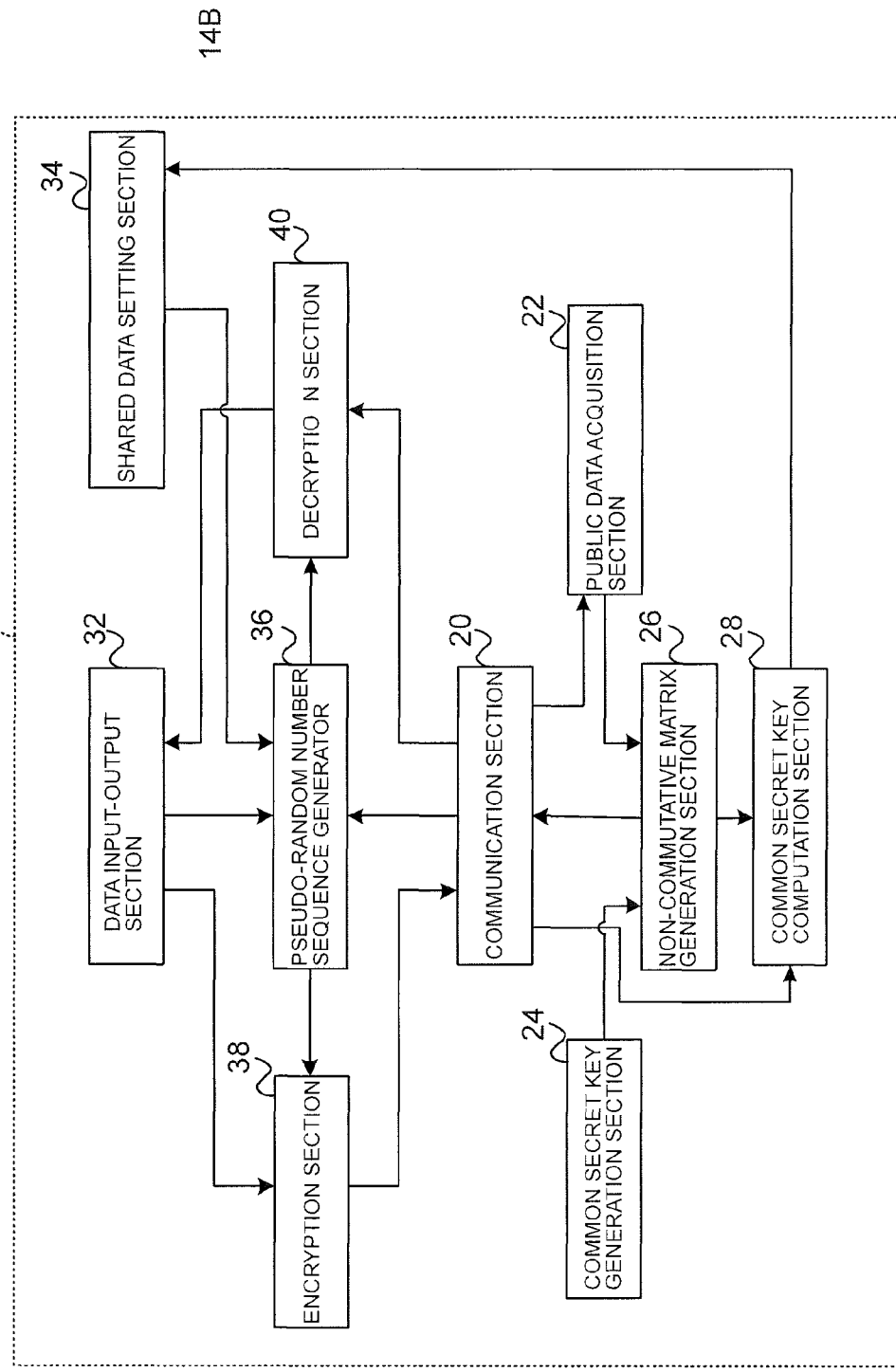
FIG. 2 is a schematic diagram illustrating a configuration of an encryption/decryption device according to an exemplary embodiment of the present invention.

The encryption/decryption devices 12A, 12B are configured by computers including a central processing unit (CPU), random access memory (RAM), read only memory (ROM) stored with a program that executes a common secret key generation processing routine and a pseudo-random number sequence generation processing routine, and are functionally configured as described below. As illustrated in FIG. 2 the encryption/decryption devices 12A, 12B include a communication section 20, a public data acquisition section 22, a secret key generation section 24, a non-commutative matrix generation section 26, a common secret key computation section 28, a data input-output section 32, a shared data setting section 34, a pseudo-random number sequence generator 36, an encryption section 38, and a decryption section 40. Note that the non-commutative matrix generation section 26 is an example of a matrix calculation section, and the common secret key computation section 28 is an example of a matrix acquisition section and a common secret key computation section. The pseudo-random number sequence generator 36 is an example of a matrix generation section, a matrix operation section, a bit sequence transformation section, a bit value determination section, and a pseudo-random number sequence generation section.

The communication section 20 performs data transmission and reception over the internet access network 16.

The data input-output section 32 is input with data output from the user terminals 14A, 14B, and outputs data to the user terminals 14A, 14B.

As public data employed in communications between communication partners through the communication section 20, the public data acquisition sections 22 of the encryption/decryption devices 12A, 12B acquire a prime number p, a natural number d, a d×d matrix Q (mod p), and a d×d matrix S (mod p) for which an inverse matrix exists. However, det Q=1, and (mod p) indicates that the value of matrix elements or variables are modulo the prime number p.

The secret key generation section 24 of the encryption/decryption device 12A generates a secret key from natural numbers $n_A$(mod p), and $k_A$(mod p).

The secret key generation section 24 of the encryption/decryption device 12B generates a secret key from natural numbers $n_B$(mod p), and $k_B$(mod p).

For each communication performed, the secret key generation section 24 generates a new secret key, and updates the secret key.

The non-commutative matrix generation section 26 of the encryption/decryption device 12A computes a d×d matrix $M_A$(mod p) by employing secret keys $n_A$, $k_A$ according to Equation (1) below, and transmits the matrix $M_A$ to the communication partner, the encryption/decryption device 12B, through the communication section 20.

$$M_A = S^{-k_A} Q^{n_A} S^{k_A} \tag{1}$$

The non-commutative matrix generation section 26 of the encryption/decryption device 12B computes a d×d matrix $M_B$(mod p) by employing secret keys $n_B$, $k_B$ according to Equation (2) below, and transmits the matrix $M_B$ to the communication partner, the encryption/decryption device 12A, through the communication section 20.

$$M_B = S^{-k_B} Q^{n_B} S^{k_B} \tag{2}$$

The common secret key computation section 28 of the encryption/decryption device 12A acquires the matrix $M_B$ received by the communication section 20, and computes a d×d matrix $M_{AB}$(mod p) by employing the acquired matrix $M_B$ according to Equation (3) below.

$$M_{AB} = S^{-kA} M_B^{nA} S^{kA} \qquad (3)$$

The common secret key computation section 28 of the encryption/decryption device 12B acquires the matrix $M_A$ received by the communication section 20, and computes a d×d matrix $M_{BA}$(mod p) by employing the acquired matrix $M_A$ according to Equation (4) below.

$$M_{BA} = S^{-kB} M_A^{nB} S^{kB} \qquad (4)$$

Figure 3:
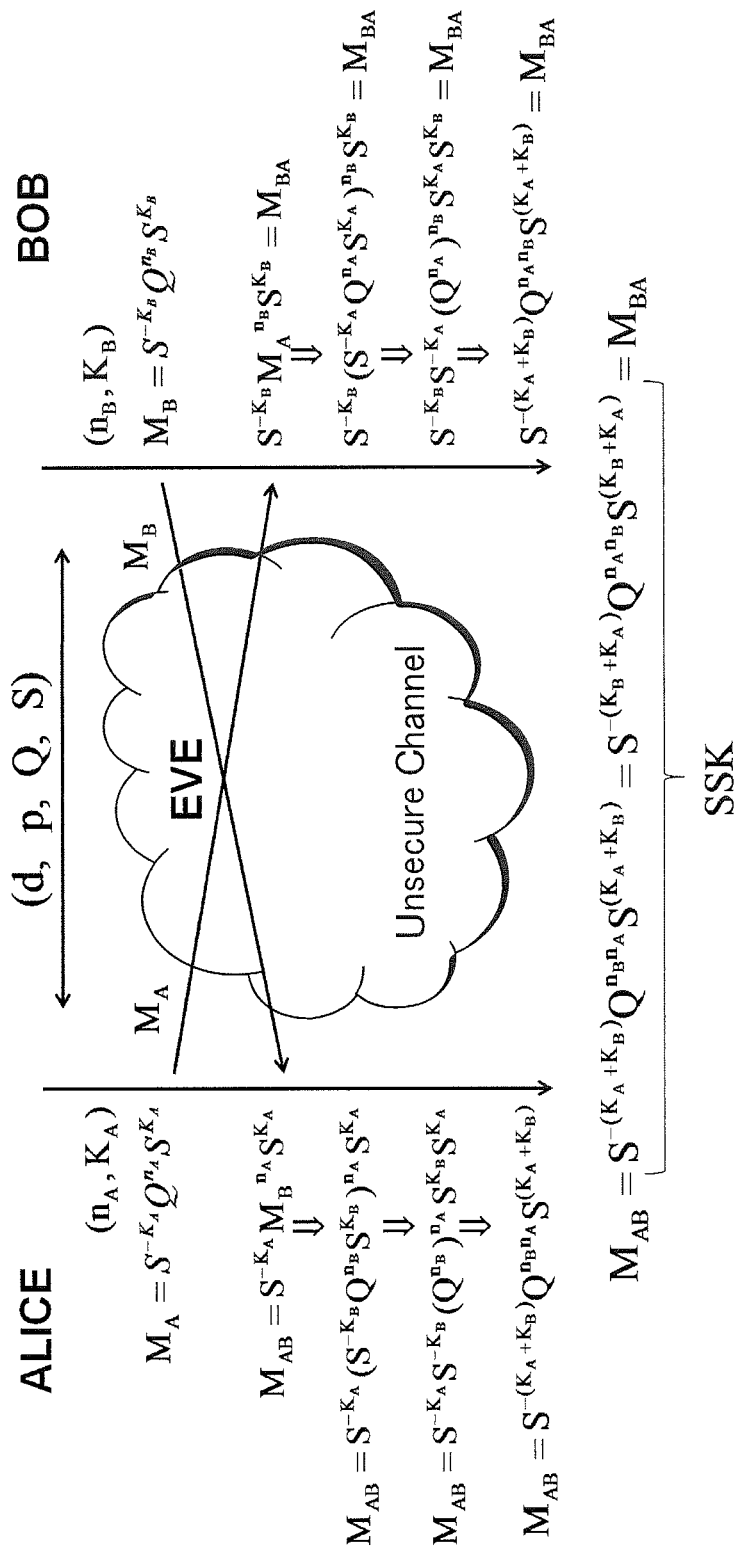
FIG. 3 is a diagram for explaining a method of computing a common secret key.

Herein, as illustrated in FIG. 3, Equation (3) converted into Equation (5) as demonstrated below.

$$M_{AB} = S^{-KA} M_B^{nA} S^{KA}$$

$$M_{AB} = S^{-KA} (S^{-KB} Q^{nB} S^{KB})^{nA} S^{KA}$$

$$M_{AB} = S^{-KA} S^{-KB} (Q^{nB})^{nA} S^{KB} S^{KA}$$

$$M_{AB} = S^{-(KA+KB)} Q^{nBnA} S^{(KA+KB)} \qquad (5)$$

Moreover, Equation (4) is converted into Equation (6) as demonstrated below.

$$S^{-KB} M_A^{nB} S^{KB} = M_{BA}$$

$$S\text{-}KB(S^{-KA} Q^{nA} S^{KA})^{nB} S^{KB} = M_{BA}$$

$$S^{-KB} S^{-KA} (Q^{nA})^{nB} S^{KA} S^{KB} = M_{BA}$$

$$S^{-(KA+KB)} Q^{nAnB} S^{(KA+KB)} = M_{BA} \qquad (6)$$

Equation (7) below is obtained from Equation (5) and Equation (6), proving equivalence between $M_{AB}$ and $M_{BA}$.

$$M_{AB} = S^{-(KA+KB)} Q^{nAnB} S^{(KA+KB)} = S^{-(KB+KA)} Q^{nAnB} S^{(KB+KA)} = M_{BA} \qquad (7)$$

The common secret key computation sections 28 of the encryption/decryption devices 12A, 12B thereby output the computed matrices $M_{AB}$, $M_{BA}$ to the shared data setting section 34 as common secret keys.

The shared data setting section 34 sets common data in the encryption/decryption devices 12A, 12B. More specifically, the matrix $M_{AB}$ ($M_{BA}$) that is the common secret key, the prime numbers p1, p2 that are private data, and an initial vector $v_0$ are set as common data.

The pseudo-random number sequence generator 36 generates a pseudo-random number bit sequence by employing the matrix $M_{AB}$ ($M_{BA}$) that is the common secret key, the prime numbers p1, p2 that are private data, and the initial vector $v_0$ according to a method described below.

The encrypting section 38 performs streaming encryption on encryption target data that has been input by the data input-output section 32, by employing the pseudo-random number bit sequence generated by the pseudo-random number sequence generator 36 as a key for one-time pad encryption. For example, as illustrated in FIG. 4A, the encryption section 38 encrypts from the start one bit at a time (or 1 byte at a time) by calculating the XOR between plain text expressed as a bit sequence, and the pseudo-random number bit sequence used as an encryption key. The data encrypted by the encrypting section 38 is data transmitted by the communication section 20.

The decryption section 40 employs the pseudo-random number bit sequence generated by the pseudo-random number sequence generator 36 as a one-time pad encryption key to perform decryption on decryption target data received from the communication section 20. For example, as illustrated in FIG. 4B, the decryption section 40 decrypts from the start one bit at a time (or 1 byte at a time) by calculating the XOR between cypher text expressed as a bit sequence, and the pseudo-random number bit sequence used as an encryption key. The data decrypted by the decryption section 40 is output to the user terminals 14A, 14B by the data input-output section 32.

Explanation next follows regarding the principle for generating the pseudo-random number bit sequence of the present exemplary embodiment.

First, the pseudo-random number sequence generator 36 generates two non-commutative matrices A1, A2 by employing the d×d matrix $M_{AB}$ (or $M_{BA}$) generated as the common secret key, and the prime numbers p1, p2 that are set as common private data as described below. Explanation follows regarding an example in which the matrix $M_{AB}$ is a 2×2 matrix.

The pseudo-random number sequence generator 36 computes a matrix A1' by employing the matrix $M_{AB}$ and the prime number p1, as illustrated in the following Equation (8).

$$A_1' = M_{AB} \bmod p_1 \qquad (8)$$

$$= \begin{pmatrix} a \bmod p_1 & b \bmod p_1 \\ c \bmod p_1 & d \bmod p_1 \end{pmatrix}$$

$$= \begin{pmatrix} a' & b' \\ c' & d' \end{pmatrix}$$

The pseudo-random number sequence generator 36 derives a generator g, $\langle g \rangle = \{1, \ldots, p_1 - 1\}$. For example, the generator for $p_1 = 7$ is, as shown below, $\langle 3 \rangle = \{1, \ldots, 6\}$.

$3^1 = 3$, $3^2 = 9 \bmod 7 = 2$, $3^3 = 27 \bmod 7 = 6$, $3^4 = 81 \bmod 7 = 4$, $3^5 = 243 \bmod 7 = 5$, and so on.

With $A_1''$ expressed by the following Equation (9), the pseudo-random number sequence generator 36 changes d' such that $\det(A_1'') = g$, and takes the $A_1''$ with changed d' as a non-commutative matrix A1.

$$A_1'' = \begin{pmatrix} g & b' \\ c' & d' \end{pmatrix}, \qquad (9)$$

The pseudo-random number sequence generator 36 employs the matrix $M_{AB}$ and the prime number p2 to compute a matrix A2' as illustrated in the following Equation (10), and generates a non-commutative matrix A2 similarly to as above.

$$A_2' = M_{AB} \bmod p_2 \qquad (10)$$

$$= \begin{pmatrix} a \bmod p_2 & b \bmod p_2 \\ c \bmod p_2 & d \bmod p_2 \end{pmatrix}$$

The cycle length O (A) of the pseudo-random number sequence generated using the non-commutative matrices A1, A2 is as written in following Equation (11) that employs the freely selected prime number p, which is employed in the generation of the non-commutative matrices A1, A2.

$$O(A) \geq p \qquad (11)$$

For example, in cases in which p is a 100000 bit prime number, then the cycle of A is the same length or longer.

The pseudo-random number sequence generator 36 obtains a vector $v_1$ by using the generated non-commutative matrix $A_1$ to transform the commonly set initial vector $v_0$. Repeating the transformation using the non-commutative matrix $A_1$ on the vector $v_1$ obtains a vector sequence $V=\{v_0, v_1, \ldots, v_t\}$. Herein, $v_i = A_1^i v_0$.

The pseudo-random number sequence generator 36 then obtains a bit sequence W1 by non-linear transformation from the obtained vector sequence V. Then, as a non-linear transformation that obtains a bit sequence W from vector sequence V, wherein the members of V given by $vi=(v_{i,0}, v_{i,1}, \ldots, v_{i,n})$, cutoff processing is performed to remove a leading bit sequence, formed from a bit sequence of continuous 0s from the leading bit and the subsequently appearing 1, from a binary transformed bit sequence of $v_{i,0}$. The remaining bit sequence after the cutoff is known to be highly randomized In the present exemplary embodiment, two types of cutoff are employed in the cutoff processing: random cut and fixed cut.

In random cut, as described above, a leading bit sequence, formed from the continuous 0s appearing at the start and the subsequently appearing 1, is cut. In fixed cut, a predetermined number of bits are cut. For example, if the number of bits for cutting in a fixed cut is 3, then the leading 3 bits are cut from the bit sequence resulting from a random cut.

Cutoff processing is performed for all members of $v_i$, and all the members after cutoff processing are sequentially combined to give a bit sequence W.

This enables the strength against attack to be raised since an attacker must test all possible cutoffs in order to reconstruct the non-commutative matrices A1, A2.

Moreover, in the present exemplary embodiment, during obtaining a new vector $v_{i+1}$ by operating the non-commutative matrices A1, A2 on the vector $v_i$, a sum calculation or product calculation between numbers is substituted into a calculation in which plural operators are combined as described below.

For example, taking a and b as 32-bit numbers, and taking a<<k as denoting that symbol a is bit shifted k-bits, a+b (sum) is substituted for a+b mod $2^{32}$. Moreover, a×b (product) is substituted for a<<(b/$2^{27}$) XOR b. Herein, a<<(b/$2^{27}$) denotes that a is bit shifted by the product of b divided by $2^{27}$, and XOR denotes that an exclusive logical sum is taken for each bit.

During obtaining a new vector $v_{i+1}$ by operating the non-commutative matrices A1, A2 on the vector $v_i$, substitutions may also be made as in the following matrix operating methods.

For example, if $v_i=(v_i^1, v_i^2, \ldots, v_i^d)$ represents the result of operating the matrix Ai times on the initial vector $v_0$ (d is the dimension of A), then a method of obtaining $v_{i+1}=(v_{i+1}^1, v_{i+1}^2, \ldots, v_{i+1}^d)$ is the following.

First, $v_{i+1}^1=(A_{vi})^1$. This is only the $1^{st}$ member of vector $A_{vi}$. The only computation that needs to be made is the computation of the $1^{st}$ member. Writing as a 2×2 matrix:

$$\begin{pmatrix} a & b \\ c & d \end{pmatrix} \begin{pmatrix} v \\ w \end{pmatrix} \rightarrow av + bw$$

wherein the sum calculation and the product calculation are, as described above, substitutable by other calculation.

Then $v_{i+1}^2=(A(v_{i+1}^1, v_i^2, \ldots, v_i^d))^2$. The second member is found by operating the non-commutative matrix A on the resultant of substituting the $1^{st}$ member of $v_i$ for $v_{i+1}^1$. The only computation that needs to be made here is the computation of the $2^{nd}$ member.

Then, $v_{i+1}^3=(A(v_{i+1}^1, v_{i+1}^2, \ldots, v_i^d))^2$. Similarly to as described above, the $3^{rd}$ member is found by substituting the $1^{st}$ member and the $2^{nd}$ member of $v_i$ and operating the non-commutative matrix A thereon.

Similar operations are performed as far as the $d^{th}$ element, and $v_{i+1}$ is obtained.

If n is the number of bits in the plain text to be encrypted, then processing on the bit sequence W1 is stopped at the point when the number of bits of the bit sequence W1 reaches n, and the remaining portion of the bit sequence W1 is discarded.

Similarly with the non-commutative matrices $A_2$, the pseudo-random number sequence generator 36 repeatedly performs operation on the vectors and cutoff processing to generate a bit sequence $W_2$. Processing on the bit sequence W2 is stopped at the point when the number of bits of the bit sequence W2 reaches n, and the remaining portion of the bit sequence W2 is discarded.

The pseudo-random number sequence generator 36 then computes the XOR between the finally obtained bit sequence W1 and the bit sequence W2, and the obtained bit sequence is taken as a pseudo-random number bit sequence. Further non-linear transformation may be performed on the bit sequence obtained by the XOR between the bit sequence W1 and bit sequence W2, and the result thereof taken as the pseudo-random number bit sequence.

As described above, the pseudo-random number sequence generator 36 generates a pseudo-random number bit sequence with the same number of bits as the number of bits of the encryption target data, or the same number of bits as the number of bits of the decryption target data.

Operation of the Encryption Processing System

Explanation next follows regarding operation of the encryption processing system 10 according to the present exemplary embodiment.

First, in order to transmit data from the user terminal 14A to the user terminal 14B, the user terminal 14A outputs transmission data to the encryption-decryption device 12A.

Figure 5:
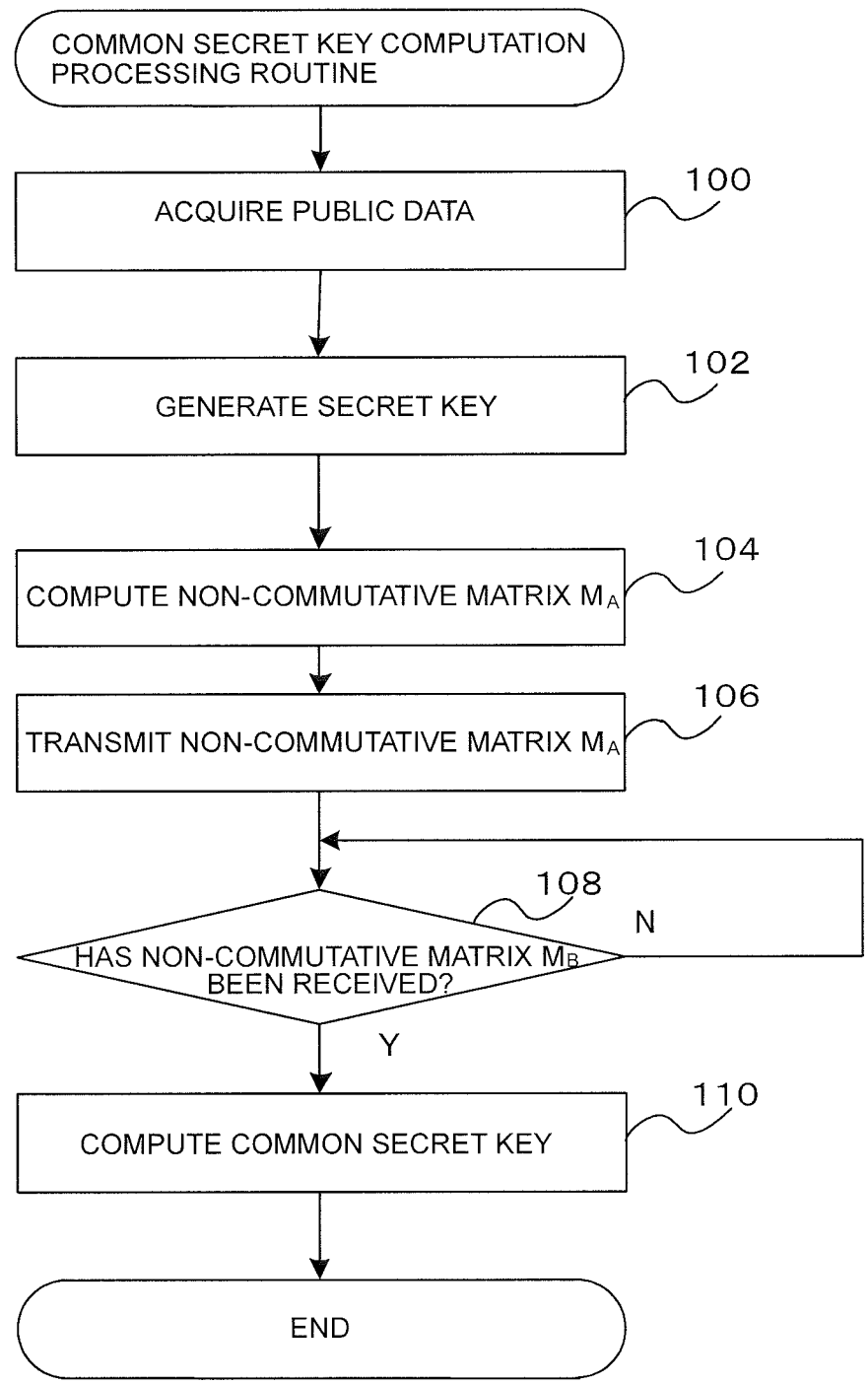
FIG. 5 is a flowchart illustrating contents of a common secret key computation processing routine of an encryption/decryption device according to an exemplary embodiment of the present invention.

Next, the encryption/decryption device 12A transmits a request to establish communications with the communication partner, the encryption/decryption device 12B, and if a response signal is received from the encryption/decryption device 12B, the common secret key computation processing routine illustrated in FIG. 5 is executed in the encryption/decryption device 12A. Similarly, the common secret key computation processing routine illustrated in FIG. 5 is also executed in the encryption/decryption device 12B. Explanation follows regarding the common secret key computation processing routine executed in the encryption/decryption device 12A.

Firstly, at step 100 the encryption/decryption device 12A acquires the public data (p, d, Q, S) used in communications between the encryption/decryption devices 12A, 12B. This is acquired, for example, by accessing public data published via the web.

Then, at step 102 the encryption/decryption device 12A generates the secret keys $n_A$, $k_A$. Next, at step 104 the encryption/decryption device 12A computes the non-commutative matrix $M_A$ according to Equation (1) above, based on the public data acquired at step 100, and the secret key generated at step 102.

At step 106 the encryption/decryption device 12A transmits the non-commutative matrix $M_A$ computed at step 104 to the communication partner, the encryption/decryption device 12B. Next, at step 108, the encryption/decryption device 12A determines whether or not the non-commutative matrix $M_B$ was received from the encryption/decryption device 12B. Processing proceeds to step 110 if the encryption/decryption device 12A receives the non-commutative matrix $M_B$ similarly computed by the encryption/decryption device 12B.

At step 110, the encryption/decryption device 12A computes the matrix $M_{AB}$ according to Equation (3) above, based on the public data acquired at step 100, the secret key generated at step 102, and the non-commutative matrix $M_B$ received at step 108, sets the matrix $M_{AB}$ as the common secret key for communications with the encryption/decryption device 12B, and the common secret key computation processing routine ends.

The common secret key computation processing routine is executed every time communications are established, a new secret key is generated each time, and a new common secret key is set.

Figure 6:
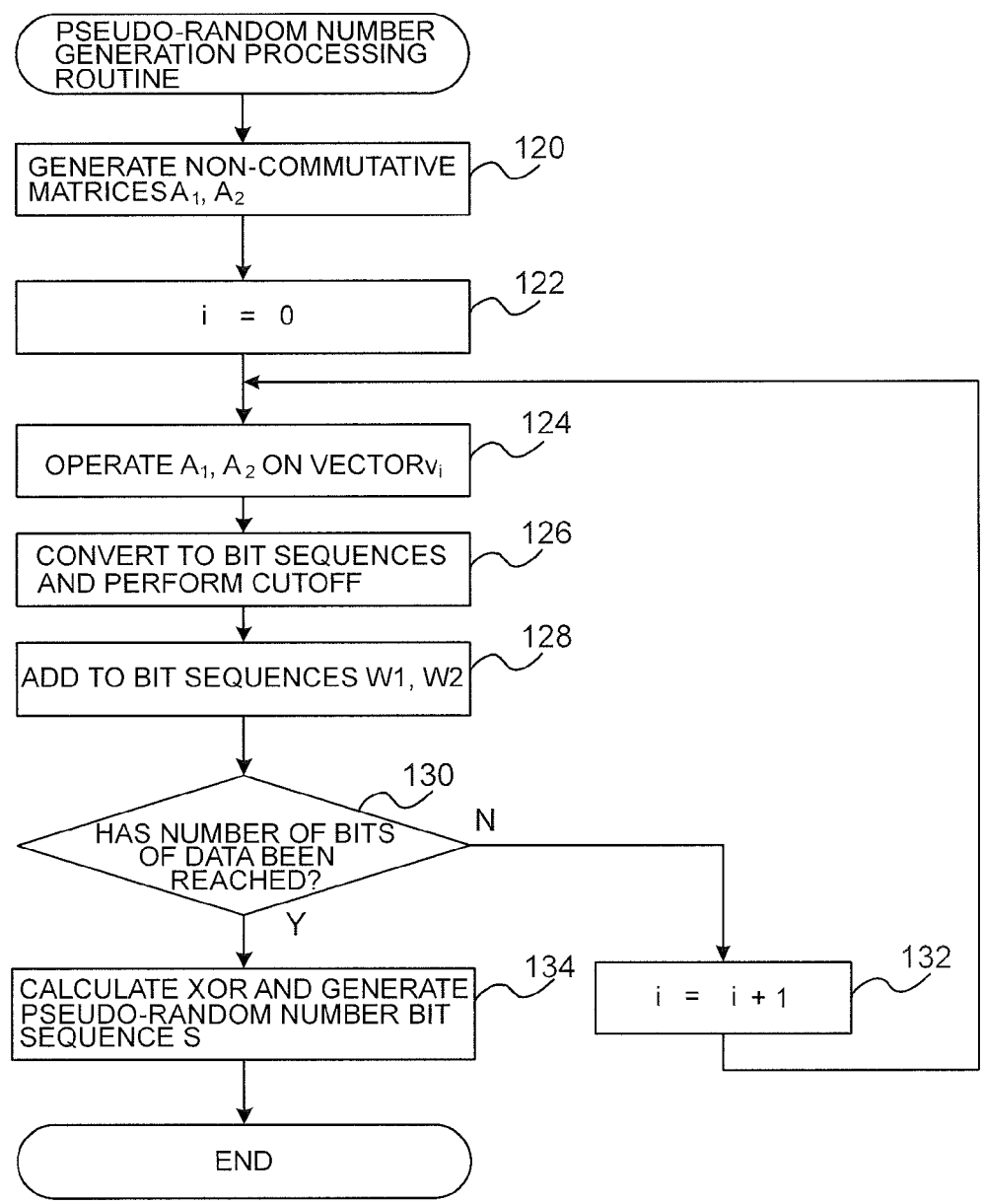
FIG. 6 is a flowchart illustrating contents of a pseudo-random number sequence generation processing routine of an encryption/decryption device according to an exemplary embodiment of the present invention.

The pseudo-random number sequence generation processing routine illustrated in FIG. 6 is executed in the encryption-decryption device 12A.

First, at step 120, the encryption-decryption device 12A employs the common secret key $M_{AB}$, and the prime numbers p1, p2 that are set in common with the encryption-decryption device 12B to generate the non-commutative matrices A1, A2. At step 122, the encryption-decryption device 12A sets a variable i that identifies vectors to an initial value of 0. The encryption/decryption device 12A then sets the initial vector $v_0$.

Next at step 124, the encryption-decryption device 12A respectively operates the non-commutative matrices A1, A2 on the vector $v_i$, and computes the vectors $v_{i+1}^1$, $v_{i+1}^2$. At step 126, the encryption/decryption device 12A transforms the respective vectors $v_{i+1}^1$, $v_{i+1}^2$ computed at step 124 into bit sequences, and cutoff processing is performed to cut a leading bit sequence from the respective bit sequences. Then at step 128, the encryption-decryption device 12A further adds, sequentially, each of the bit sequences obtained at step 126 to the bit sequences W1, W2.

At step 130, the encryption-decryption device 12A determines whether or not the number of bits of each of the bit sequences W1, W2 has reached the number of bits of the bit sequence of the transmission data (encryption target data). If the number of bits of each of the bit sequences W1, W2 has not reached the number of bits of the bit sequence of the transmission data (encryption target data) input from the user terminal 14A, then, at step 132, the encryption-decryption device 12A increments the variable i by 1, processing returns to step 124, and processing from step 124 onwards is repeated. If the number of bits has reached the number of bits of the bit sequence of the transmission data only for the bit sequence W1 then processing using the non-commutative matrix A1 is not performed in the processing from step 124 onwards. If the number of bits has reached the number of bits of the bit sequence of the transmission data only for the bit sequence W2 then processing using the non-commutative matrix A2 is not performed in the processing from step 124 onwards.

Processing proceeds to step 134 if at step 130 the number of bits is determined to have reached the number of bits of the transmission data bit sequence for both the bit sequences W1, W2.

At step 134, the encryption-decryption device 12A calculates the XOR between the bit sequences W1, W2, generates a pseudo-random number bit sequence S, and ends the pseudo-random number sequence generation processing routine.

The encryption-decryption device 12A then generates encrypted transmission data by calculating the XOR between the pseudo-random number bit sequence S generated by the pseudo-random number sequence generation processing routine described above and the bit sequence of the transmission data input from the user terminal 14A. The encryption-decryption device 12A then transmits the encrypted transmission data to the user terminal 14B, via the internet access network 16.

The encrypted transmission data is received by the encryption-decryption device 12B, and the pseudo-random number sequence generation processing routine illustrated in FIG. 6 is similarly executed in the encryption-decryption device 12B to generate a pseudo-random number bit sequence S having the same number of bits as the encrypted transmission data.

The encryption-decryption device 12B generates plain text of the encrypted transmission data by calculating the XOR between the generated pseudo-random number bit sequence S and the bit sequence of the encrypted transmission data. The encryption-decryption device 12B outputs transmission data plain text to the user terminal 14B designated as the transmission destination.

Next, explanation follows regarding the results of tests performed using the common secret key computation algorithm explained in the exemplary embodiment above.

The speed of key sharing between two parties was verified. A secret key was generated, and the calculation time for the exchange to complete was measured.

The test environment was as follows. Performance was as illustrated in the following Table 1 in Windows 7 (registered trade mark).

TABLE 1

| CPU | E5300@2.6 GHz Intel Pentium |
|---|---|
| RAM | 4 GB DDR 2 800 (vData 2 × 2 GB) |
| HDD | 500 GB 7200 RPM (Western Digital Caviar Blue) |
| OS | MS Windows 7 32-bit |

Figure 7:
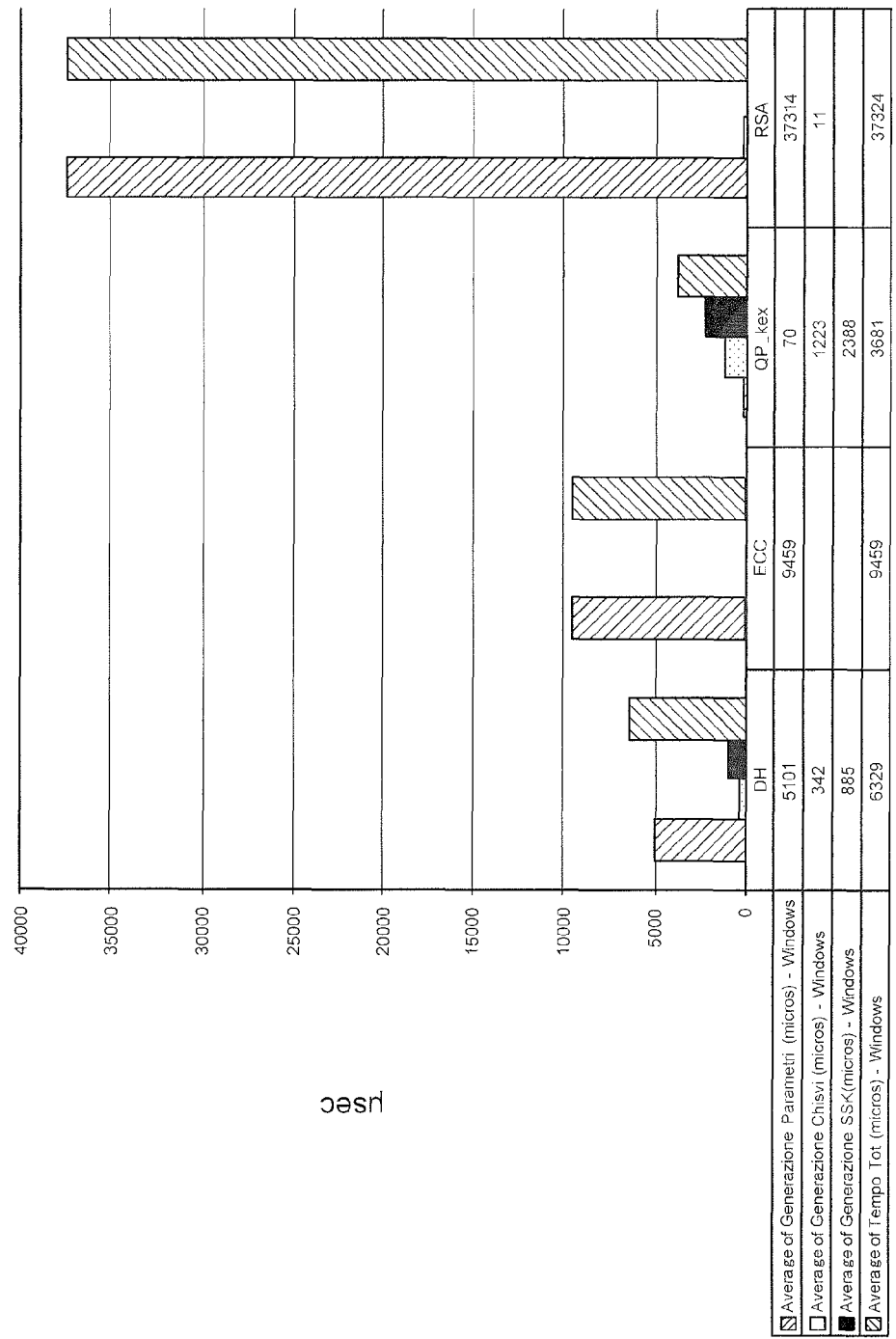
FIG. 7 is a graph illustrating test results on a computer.

Speed comparisons were performed against (RSA public key cryptography (see RSA in FIG. 7)), Diffie-Hellman cryptography (see DH in FIG. 7), and elliptic curve cryptography (see ECC in FIG. 7), and the speed of key generation, public data generation, and key sharing was plotted. According to the graph illustrated in FIG. 7, the method proposed in the present exemplary embodiment (see QP-kex in FIG. 7) was notably faster than the other methods, and in particular, a 10-fold speed increase compared with RSA was apparent.

Implementation tests were also performed on a mobile terminal like that described in Table 2 below.

TABLE 2

| CPU | TI OMAP 1710, 220 MHz processor |
|---|---|
| OS | Symbian OS 8.1a, Series 60 UI operating system |

Figure 8:
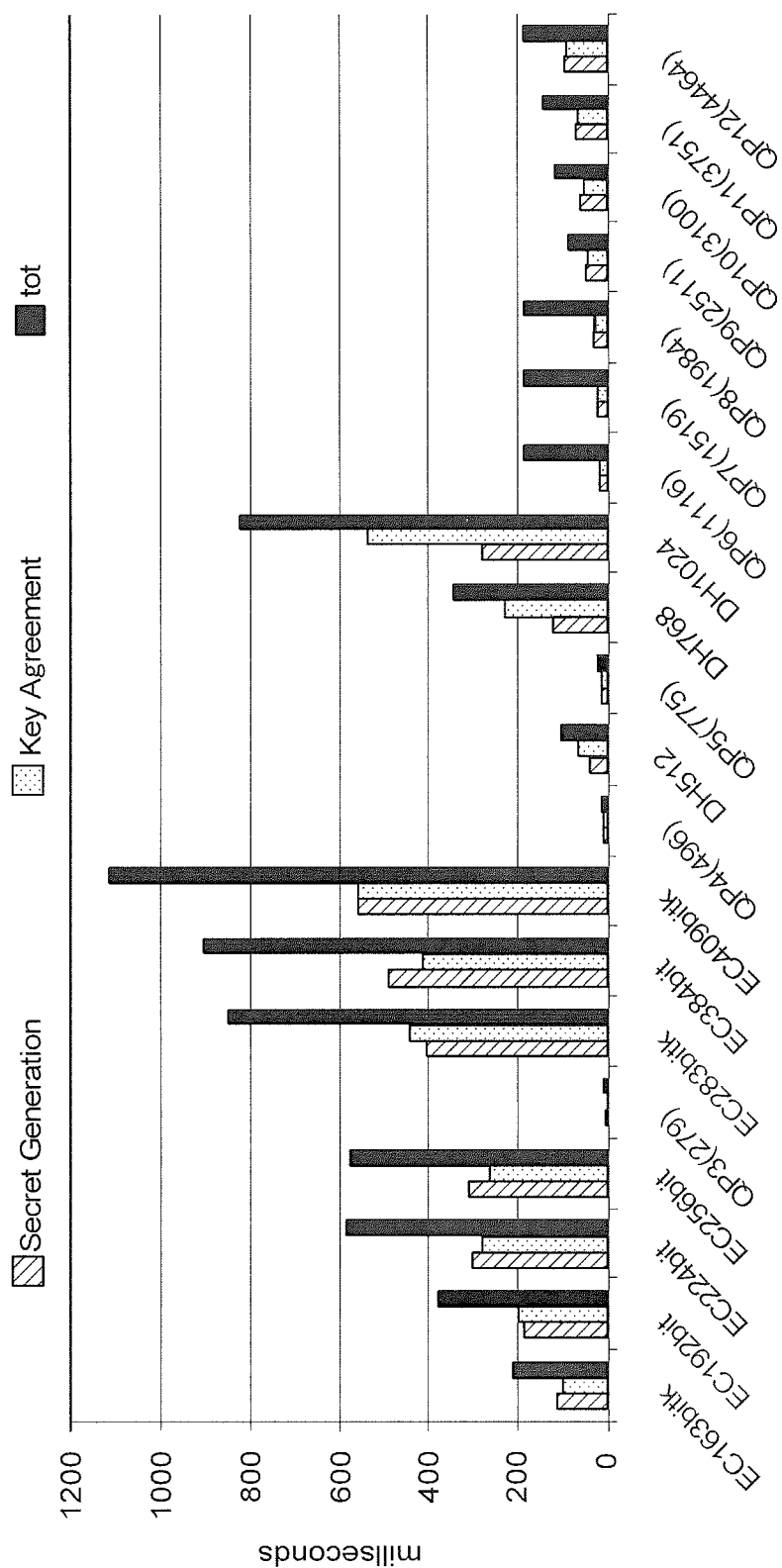
FIG. 8 is a graph illustrating test results on a mobile terminal.

The terminal is a Nokia® N70 platform. Diffie-Hellman cryptography (see DH in FIG. 8), and elliptic curve cryptography (see ECC in FIG. 8), are used for comparison. RSA public key cryptography was omitted due to the considerably high execution time thereof. Method names and keys lengths are given by the horizontal axis, and execution times are given by the vertical axis. According to the graph illustrated in FIG. 8, even on a compact device, the method proposed in the present exemplary embodiment (see QP in FIG. 8) had a notably faster execution time in comparison to the other methods, and it was apparent that the execution time did not increase with increasing key length.

As explained above, the encryption/decryption device according to the present exemplary embodiment of the present invention exchanges a non-commutative matrix, computed using the public data and the secret key, with a communication partner, and computes the common secret key using the non-commutative matrix obtained from the communication partner, enabling high-speed, secure common secret key generation.

The encryption/decryption device also enables keys of great length to be made common using high-speed processing.

With regards to the strength of the common secret key against attack, an attacker must solve the following problem to obtain the secret keys $n_A$, $k_A$ (or $n_B$, $k_B$) from the public data (p, d, Q, S) and the public keys $M_A$, $M_B$.

Problem: find $n_A$, $k_A$ such that the following is satisfied.

$$M_A = S^{-KA} Q^{nA} S^{KA}$$

This is a much more difficult problem than that posed by DH (the discrete logarithm problem). Even supposing $n_A$ could be obtained, obtaining $k_A$ would require a nonlinear problem to be solved. When doing so, an indefinite equation is encountered, and the probability of obtaining a solution mathematically is 0. The generated common secret key is therefore mathematically more rigorously secure than D-H.

In the encryption-decryption device, the sum calculation and the product calculation of operations of the non-commutative matrices A1, A2 are substituted into a calculation method combining plural operator types, the non-commutative matrices A1, A2 are repeatedly operated on the initial vector and non-linear transformation is performed, the XOR of the obtained bit sequences W1, W2 is computed, and a pseudo-random number bit sequence is derived. By employing the pseudo-random number bit sequence for encrypting or decrypting, the encryption-decryption device is able to increase the speed of encryption processing or decryption processing in cases in which the number of bits of the encryption target data or the decryption target data is modifiable, and is also able to improve the cryptographic strength. Combining the common secret key generation method with the encryption/decryption method that employs random numbers enables the encryption-decryption device to establish high speed and secure streaming encryption.

It is also possible to achieve higher speeds than other streaming encryption protocols, and can be implemented on compact devices with low computing power.

In the pseudo-random number sequence generation algorithm, using a number of non-linear transformations enables the statistical randomness and length of cycle of the pseudo-random number sequence to be assured, and a safe disposable encryption key (one-time pad key) can be generated by using the generated pseudo-random number sequence.

Moreover, due to being able to implement streaming encryption, multimedia files, such as audio and video, can be transmitted both safely and at high speed.

The present invention is not limited by the exemplary embodiment described above, and various modifications and applications are possible within a range not departing from the spirit of the invention.

For example, configuration may be made such that the communications take place between a server and a mobile device. The common secret key generation method operates at high-speed in even a mobile environment and enables the computational load for key exchange performed between two parities to be distributed unevenly, and is therefore applicable to communications between a server and a mobile device.

In addition to streaming encryption, the present invention may also be applied in applications such as vehicle keyless entry. Application may also be made to Hard Disk Drive (HDD) encryption. For example, all the data saved on a HDD may be encrypted by the encryption method of the exemplary embodiment described above so that it can only be read by the authorized user. The present invention is also applicable to security in cloud services.

Explanation has been given in the present specification of an exemplary embodiment in which a program is pre-installed, however the program may be provided stored on a computer-readable storage medium.

A computer readable medium of a first aspect of the present invention is a computer readable medium stored with a program that causes a computer to function as: a public data setting section that sets public data including a prime number p, a natural number d, a d×d matrix Q (mod p) with determinant equal to 1, and a d×d matrix S (mod p) for which an inverse matrix exists; a secret key generation section that generates a secret key including natural numbers $n_A$(mod p), $k_A$(mod p); a matrix calculation section that employs the secret key to calculate a d×d matrix $M_A$(mod p) according to the following Equation (IV), and transmits the matrix $M_A$ to a communication partner; a matrix acquisition section that acquires a d×d matrix $M_B$(mod p), calculated by employing natural numbers $n_B$(mod p), $k_B$(mod p) included in a secret key of the communication partner according to the following Equation (V); and a common secret key computation section that computes a d×d matrix $M_{AB}$(mod p) as a common secret key by employing the matrix $M_B$ acquired by the matrix acquisition section according to the following Equation (VI).

$$M_A = S^{-kA} Q^{nA} S^{kA} \quad (IV)$$

$$M_B = S^{-kB} Q^{nB} S^{kB} \quad (V)$$

$$M_{AB} = S^{-kA} M_B^{nA} S^{kA} \quad (VI)$$

The entire contents of the disclosure of Japanese Patent Application No. 2012-151835 are incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. An encryption device comprising:
a processor; and
memory storing instructions executable by the processor, wherein execution of the instructions by the processor causes the encryption device to:
set public data including a prime number p, a natural number d, a d×d matrix Q (mod p) with determinant equal to 1, and a d×d matrix S (mod p) for which an inverse matrix exists;
generate a secret key including natural numbers $n_A$ (mod p), $k_A$ (mod p);

employ the secret key to calculate a d×d matrix $M_A$ (mod p) according to $M_A = S^{-kA}Q^{nA}S^{kA}$, and transmit the matrix $M_A$ to a communication partner;

acquire a d×d matrix $M_B$ (mod p), calculated by employing natural numbers $n_B$ (mod p), $k_B$ (mod p) included in a secret key of the communication partner according to $M_B = S^{-kB}Q^{nB}S^{kB}$; and compute a d×d matrix $M_{AB}$ (mod p) as a common secret key by employing the matrix $M_B$ according to $M_{AB} = S^{-kA}M_B{}^{nA}S^{kA}$;

generate two non-commutative matrices A1, A2, based on the common secret key $M_{AB}$ and two prime numbers p1, p2, that are set in common with a decryption device;

iteratively derive:

a vector $v_i^1$ by operating the non-commutative matrix A1 on a d dimensional initial vector $v_0$ set in common with the decryption device or on a d dimensional vector $v_{i-1}^1$ that was derived in a preceding iteration, and a vector $v_i^2$ by operating the non-commutative matrix A2 on the initial vector $v_0$ or on a d dimensional vector $v_{i-1}^2$ that was derived in the preceding iteration, wherein at least one out of a sum calculation or a product calculation for operations of the non-commutative matrices A1, A2 is substituted into a predetermined calculation method combining a plurality of operator types, and performs operations of the non-commutative matrices A1, A2; and a bit sequence $W1_i$ by performing a non-linear transformation to transform the vector $v_i^1$ into a transformed bit sequence and by joining the transformed bit sequence to the bit sequence $W1_{i-1}$ that was derived in the preceding iteration, and a bit sequence $W2_i$ by performing a non-linear transformation to transform the vector $v_i^2$ into a bit sequence and by joining the transformed bit sequence to the bit sequence $W2_{i-1}$ that was derived in the preceding iteration;

where the iterative derivation is repeated until a respective number of bits of the derived bit sequence $W1_i$ and the derived bit sequence $W2_i$ have reached a number of bits of a bit sequence expressing encryption target data;

in response to reaching the number of bits, derive a pseudo-random number bit sequence by calculating an exclusive logical sum between the bit sequence $W1_i$ and the bit sequence $W2_i$; and encrypt the encryption target data by calculating an exclusive logical sum between the pseudo-random number bit sequence and the bit sequence expressing the encryption target data.

2. The encryption device of claim 1, wherein execution of the instructions by the processor causes the encryption device to generate and renew the secret key including the natural numbers $n_A$ (mod p), $k_A$ (mod p) for every respective communication with the communication partner.

3. A decryption device, comprising:

a processor; and memory storing instructions executable by the processor, wherein execution of the instructions by the processor causes the decryption device to:

set public data including a prime number p, a natural number d, a d×d matrix Q (mod p) with determinant equal to 1, and a d×d matrix S (mod p) for which an inverse matrix exists;

generate a secret key including natural numbers $n_A$ (mod p), $k_A$ (mod p);

employ the secret key to calculate a d×d matrix $M_A$ (mod p) according to $M_A = S^{-kA}Q^{nA}S^{kA}$, and transmit the matrix $M_A$ to a communication partner;

acquire a d×d matrix $M_B$ (mod p), calculated by employing natural numbers $n_B$ (mod p), $k_B$ (mod p) included in a secret key of the communication partner according to $M_B = S^{-kB}Q^{nB}S^{kB}$; and compute a d×d matrix $M_{AB}$ (mod p) as a common secret key employing the matrix $M_B$ according to $M_{AB} = S^{-kA}M_B{}^{nA}S^{kA}$;

generate two non-commutative matrices A1, A2, based on the common secret key $M_{AB}$ and two prime numbers p1, p2, that are set in common with an encryption device;

iteratively derive:

a vector $vi^1$ by operating the non-commutative matrix A1 on a d dimensional initial vector $v_0$ set in common with the encryption device or on a d dimensional vector $v_{i-1}^1$ that was derived in a preceding iteration, and a vector $v_i^2$ by operating the non-commutative matrix A2 on the initial vector $v_0$ or on a d dimensional vector $v_{i-1}^2$ that was derived in a preceding iteration, wherein at least one out of a sum calculation or a product calculation for operations of the non-commutative matrices A1, A2 is substituted into a predetermined calculation method combining a plurality of operator types, and performs operations of the non-commutative matrices A1, A2; and a bit sequence $W1_i$ by performing a non-linear transformation to transform the vector $v_i^1$ into a transformed bit sequence and by joining the transformed bit sequence to the bit sequence $W1_{i-1}$ that was derived in the preceding iteration, and a bit sequence $W2_i$ by performing a non-linear transformation to transform the vector $v_i^2$ into a bit sequence and by joining the transformed bit sequence to the bit sequence $W2_{i-1}$ that was derived in the preceding iteration;

where the iterative derivation is repeated until a respective number of bits of the derived bit sequence $W1_i$ and the derived bit sequence $W2_i$ have reached a number of bits of a bit sequence expressing decryption target data;

in response to reaching the number of bits, derive a pseudo-random number bit sequence by calculating an exclusive logical sum between the bit sequence $W1_i$ and the bit sequence $W2_i$; and decrypt the decryption target data by calculating an exclusive logical sum between the pseudo-random number bit sequence and the bit sequence expressing the decryption target data.

4. The decryption device of claim 3, wherein execution of the instructions by the processor causes the decryption device to generate and renew the secret key including the natural numbers $n_A$ (mod p), $k_A$ (mod p) for every respective communication with the communication partner.

5. A non-transitory computer readable medium storing a program causing a computer to execute a process for common secret key generation, the process comprising:

setting public data including a prime number p, a natural number d, a d×d matrix Q (mod p) with determinant equal to 1, and a d×d matrix S (mod p) for which an inverse matrix exists;

generating a secret key including natural numbers $n_A$ (mod p), $k_A$ (mod p);

employing the secret key to calculate a d×d matrix $M_A$ (mod p) according to $M_A = S^{-k_A} Q^{n_A} S^{k_A}$, and transmitting the matrix $M_A$ to a communication partner;

acquiring a d×d matrix $M_B$ (mod p), calculated by employing natural numbers $n_B$ (mod p), $k_B$ (mod p) included in a secret key of the communication partner according to $M_B = S^{-k_B} Q^{n_B} S^{k_B}$; and computing a d×d matrix $M_{AB}$ (mod p) as a common secret key by employing the matrix $M_B$ acquired by the matrix acquisition section according to $M_{AB} = S^{-k_A} M_B^{n_A} S^{k_A}$;

generate two non-commutative matrices A1, A2, based on the common secret key $M_{AB}$ and two rime numbers p1, p2 that are set in common with an encryption device;

iteratively deriving:
- a vector $v_i^1$ by operating the non-commutative matrix A1 on a d dimensional initial vector $v_0$ set in common with the decryption device or on a d dimensional vector $v_{i-1}^1$ that was derived in a preceding iteration, and a vector $v_i^2$ by operating the non-commutative matrix A2 on the initial vector $v_0$ or on a d dimensional vector $v_{i-1}^2$ that was derived in the preceding iteration, wherein at least one out of a sum calculation or a product calculation for operations of the non-commutative matrices A1, A2 is substituted into a predetermined calculation method combining a plurality of operator types, and performs operations of the non-commutative matrices A1, A2; and
- a bit sequence $W1_i$ by performing a non-linear transformation to transform the vector $v_i^1$ into a transformed bit sequence and by joining the transformed bit sequence to the bit sequence $W1_{i-1}$ that was derived in the preceding iteration, and a bit sequence $W2_i$ by performing a non-linear transformation to transform the vector $v_i^2$ into a bit sequence and by joining the transformed bit sequence to the bit sequence $W2_{i-1}$ that was derived in the preceding iteration;

where the iterative derivation is repeated until a respective number of bits of the derived bit sequence $W1_i$ and the derived bit sequence $W2_i$ have reached a number of bits of a bit sequence expressing encryption target data;

in response to reaching the number of bits, deriving a pseudo-random number bit sequence by calculating an exclusive logical sum between the bit sequence $W1_i$ and the bit sequence $W2_i$; and encrypting the encryption target data by calculating an exclusive logical sum between the pseudo-random number bit sequence and the bit sequence expressing the encryption target data.

6. An encryption method, comprising:

setting public data including a prime number p, a natural number d, a d×d matrix Q (mod p) with determinant equal to 1, and a d×d matrix S (mod p) for which an inverse matrix exists;

generating a secret key including natural numbers $n_A$ (mod p), $k_A$ (mod p);

employing the secret key to calculate a d×d matrix $M_A$ (mod p) according to $M_A = S^{-k_A} Q^{n_A} S^{k_A}$ and transmits the matrix $M_A$ to a communication partner;

acquiring a d×d matrix $M_B$ (mod p), calculated by employing natural numbers $n_B$ (mod p), $k_B$ (mod p) included in a secret key of the communication partner according to $M_B = S^{-k_B} Q^{n_B} S^{k_B}$; and computing a d×d matrix $M_{AB}$ (mod p) as a common secret key by employing the matrix $M_B$ acquired by the matrix acquisition section according to $M_{AB} = S^{-k_A} M_B^{n_A} S^{k_A}$;

generating two non-commutative matrices A1, A2, based on the common secret key $M_{AB}$ and two prime numbers p1, p2, that are set in common with a decryption device;

iteratively deriving:
- a vector $v_i^1$ by operating the non-commutative matrix A1 on a d dimensional initial vector $v_0$ set in common with the decryption device or on a d dimensional vector $v_{i-1}^1$ that was derived in a preceding iteration, and a vector $v_i^2$ by operating the non-commutative matrix A2 on the initial vector $v_0$ or on a d dimensional vector $v_{i-1}^2$ that was derived in a preceding iteration, wherein at least one out of a sum calculation or a product calculation for operations of the non-commutative matrices A1, A2 is substituted into a predetermined calculation method combining a plurality of operator types, and performs operations of the non-commutative matrices A1, A2; and
- a bit sequence $W1_i$ by performing a non-linear transformation to transform the vector $v_i^1$ into a transformed bit sequence and joining the transformed bit sequence to the bit sequence $W1_{i-1}$ that was derived in the preceding iteration, and a bit sequence $W2_i$ by performing a non-linear transformation to transform the vector $v_i^2$ into a bit sequence and joining the transformed bit sequence to the bit sequence $W2_{i-1}$ that was derived in the preceding iteration;

where the iterative derivation is repeated until a respective number of bits of the derived bit sequence $W1_i$ and the bit derived sequence $W2_i$ have reached a number of bits of a bit sequence expressing encryption target data;

in response to reaching the number of bits, deriving a pseudo-random number bit sequence by calculating an exclusive logical sum between the bit sequence $W1_i$ and the bit sequence $W2_i$; and encrypting the encryption target data by calculating an exclusive logical sum between the pseudo-random number bit sequence and the bit sequence expressing the encryption target data.

7. A decryption method, comprising:

setting public data including a prime number p, a natural number d, a d×d matrix Q (mod p) with determinant equal to 1, and a d×d matrix S (mod p) for which an inverse matrix exists;

generating a secret key including natural numbers $n_A$ (mod p), $k_A$ (mod p):

employing the secret key to calculate a d×d matrix $M_A$ (mod p) according to $M_A = S^{-k_A} Q^{n_A} S^{k_A}$ and transmits the matrix $M_A$ to a communication partner:

acquiring a d×d matrix $M_B$ (mod p), calculated by employing natural numbers $n_B$(mod p), $k_B$ (mod p) included in a secret key of the communication partner according to $M_B = S^{-k_B} Q^{n_B} S^{k_B}$; and computing a d×d matrix $M^{AB}$ (mod p) as a common secret key by employing the matrix $M_B$ acquired by the matrix acquisition section according to $M_{AB} = S^{-k_A} M_B^{n_A} S^{k_A}$;

generating two non-commutative matrices A1, A2, based on the common secret key $M_{AB}$ and two prime numbers p1, p2, that are set in common with an encryption device;

iteratively deriving:
- a vector $v_i^1$ by operating the non-commutative matrix A1 on a d dimensional initial vector $v_0$ set in common with the encryption device or on a d dimensional vector $v_{i-1}$ that was derived in a preceding iteration, and a vector $v_i^2$ by operating the non-commutative matrix A2 on the initial vector $v_0$ or on a d dimensional vector $v_{i-1}^2$ that was derived in a preceding iteration, wherein at least one out of a sum calculation or a product calculation for operations of the non-commutative matrices A1, A2 is substituted into a predetermined calculation method combining a plurality of operator types, and performs operations of the non-commutative matrices A1, A2; and a bit sequence W1$_i$ by performing a non-linear transformation to transform the vector $v_i^1$ into a transformed bit sequence and joining the transformed bit sequence to the bit sequence W1$_{i-1}$ that was derived in the preceding iteration, and a bit sequence W2$_i$ by performing a non-linear transformation to transform the vector $v_i^2$ into a bit sequence and joining the transformed bit sequence to the bit sequence W2$_{i-1}$ that was derived in the preceding iteration;

where the iterative derivation is repeated until a respective number of bits of the derived bit sequence W1$_i$ and the derived bit sequence W2$_i$ have reached a number of bits of a bit sequence expressing decryption target data;

in response to reaching the number of bits, deriving a pseudo-random number bit sequence by calculating an exclusive logical sum between the bit sequence W1 and the bit sequence W2$_i$; and decrypting the decryption target data by calculating an exclusive logical sum between the pseudo-random number bit sequence and the bit sequence expressing the decryption target data.

8. A non-transitory computer readable medium storing a program causing a computer to execute a process for common secret key generation, the process comprising:

setting public data including a prime number p, a natural number d, a d×d matrix Q (mod p) with determinant equal to 1, and a d×d matrix S (mod p) for which an inverse matrix exists;

generating a secret key including natural numbers $n_A$ (mod p), $k_A$ (mod p);

employing the secret key to calculate a d×d matrix $M_A$ (mod p) according to $M_A = S^{-k_A} Q^{n_A} S^{k_A}$, and transmitting the matrix $M_A$ to a communication partner;

acquiring a d×d matrix $M_B$ (mod p), calculated by employing natural numbers $n_B$ (mod p), $k_B$ (mod p) included in a secret key of the communication partner according to $M_B = S^{-k_B} Q^{n_B} S^{k_B}$; and computing a d×d matrix $M_{AB}$ (mod p) as a common secret key by employing the matrix $M_B$ acquired by the matrix acquisition section according to $M_{AB} = S^{-k_A} M_B^{n_A} S^{k_A}$;

generate two non-commutative matrices A1, A2, based on the common secret key $M_{AB}$ and two prime numbers p1, p2, that are set in common with an encryption device;

iteratively deriving:

a vector $vi^1$ by operating the non-commutative matrix A1 on a d dimensional initial vector $v_0$ set in common with the encryption device or on a d dimensional vector $v_{i-1}^1$ that was derived in a preceding iteration, and a vector $v_i^2$ by operating the non-commutative matrix A2 on the initial vector $v_0$ or on a d dimensional vector $v_{i-1}^2$ that was derived in a preceding iteration, wherein at least one out of a sum calculation or a product calculation for operations of the non-commutative matrices A1, A2 is substituted into a predetermined calculation method combining a plurality of operator types, and performs operations of the non-commutative matrices A1, A2; and a bit sequence W1$_i$ by performing a non-linear transformation to transform the vector $v_i^1$ into a transformed bit sequence and by joining the transformed bit sequence to the bit sequence W1$_{i-1}$ that was derived in the preceding iteration, and a bit sequence W2$_i$ by performing a non-linear transformation to transform the vector $v_i^2$ into a bit sequence and by joining the transformed bit sequence to the bit sequence W2$_{i-1}$ that was derived in the preceding iteration;

where the iterative derivation is repeated until a respective number of bits of the derived bit sequence W1$_i$ and the derived bit sequence W2$_i$ have reached a number of bits of a bit sequence expressing decryption target data;

in response to reaching the number of bits, deriving a pseudo-random number bit sequence by calculating an exclusive logical sum between the bit sequence W1$_i$ and the bit sequence W2$_i$; and decrypting the decryption target data by calculating an exclusive logical sum between the pseudo-random number bit sequence and the bit sequence expressing the decryption target data.

\* \* \* \* \*